G. A. WENDT.
AUTOMOBILE HEADLIGHT.
APPLICATION FILED MAR. 24, 1920.
1,403,528.
Patented Jan. 17, 1922.
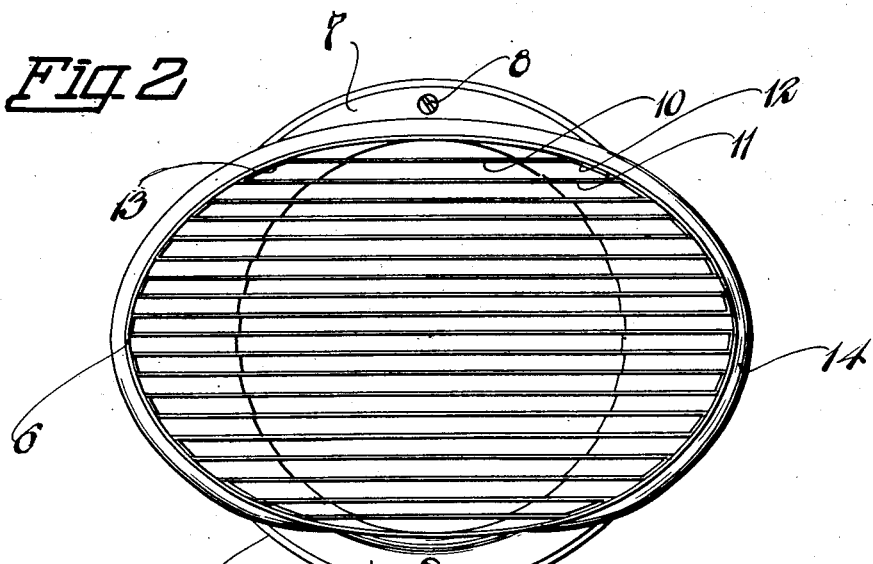
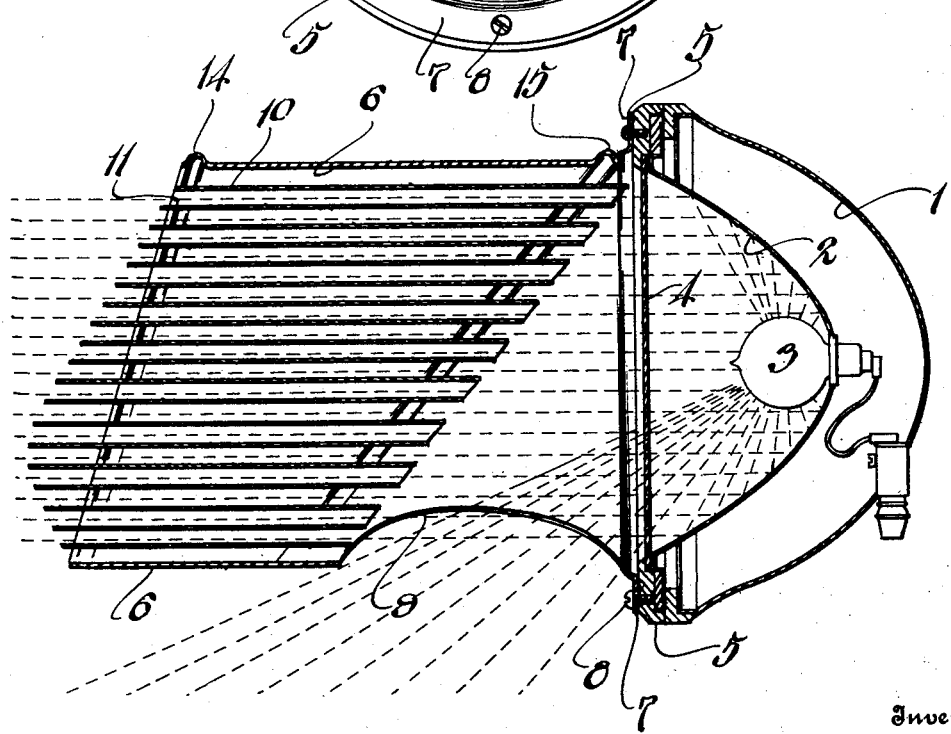
Inventor
Gustave A. Wendt

UNITED STATES PATENT OFFICE.

GUSTAVE A. WENDT, OF SPOKANE, WASHINGTON.

AUTOMOBILE HEADLIGHT.

1,403,528.  Specification of Letters Patent.  Patented Jan. 17, 1922.

Application filed March 24, 1920. Serial No. 368,211.

*To all whom it may concern:*

Be it known that I, GUSTAVE A. WENDT, a citizen of the United States, residing at Spokane, in Spokane County and State of Washington, have invented certain new and useful Improvements in Automobile Headlights, of which the following is a specification.

The present invention relates to improvements in automobile headlights and contemplates an attachment to existing lamps, or the embodiment of an essential feature in manufactured lamps, designed for the purpose of directing the light rays in the proper directions for an effective headlight, and at the same time providing for a non-glare headlight to avoid dazzling the eyes of the operator of an approaching vehicle or automobile, or pedestrian.

To this end the invention consists in the combination and arrangement with the standard or usual form of automobile headlights of a casing or hood projected from the front of the headlight lamp and provided with means for illuminating the roadway directly in front of the automobile, and with means for insuring the passage of a beam of light, for distant illumination, forwardly, on a plane parallel with the longitudinal axis of the lamp, thus obscuring from the eyes of a person in front of the lamp the dazzling direct rays of the lamp at all times except when the eye is directly in line with the longitudinal or horizontal axis of the lamp.

By this achievement of results most of the glare from direct rays of the lamp is eliminated, and the glare may be observed or encountered only when the eye of the beholder comes in direct line with the plane of the projected light rays from the lamp. Provision is made for forward and lateral distribution of the light rays from the front of the hood for distant illumination, and means are also provided for illuminating the roadway immediately in front of the automobile, as will be more particularly pointed out and claimed.

In the accompanying drawings I have illustrated one complete example of the physical embodiment of my invention constructed according to the best mode I have so far devised for the practical application of the principles of my invention, the device forming the subject matter of the invention being shown applied to the front of a standard or usual form of automobile headlight lamp.

Figure 1 is a vertical, longitudinal, sectional view of a lamp and the device of my invention attached thereto and forming an essential part thereof.

Figure 2 is a front view, in elevation of the lamp and headlight of Figure 1.

For a clear understanding of the invention I have employed in Figure 1 a conventional form of automobile headlight lamp comprising the outer metallic shell 1 of approved form and the inner, reflector casing 2 for projecting the light rays from the lamp 3 shown as an electric light bulb, and the lamp is equipped with the usual glass 4. The glass is retained by the front plate or ring 5 of the lamp, preferably circular in outline, and the front plate is utilized for the attachment of the device forming the subject matter of my invention.

In its preferred form the attachment comprises a tubular metallic hood or casing 6, which at its rear end is fashioned to cylindrical form, and at its front end merges into an elliptical form in cross section, the vertical or shorter diameter of the ellipse being approximately the same as the diameter of the rear end of the hood, and the longitudinal or major diameter of the ellipse being of sufficient length to insure a lateral distribution of the light rays, as well as direct forward projection of the light rays from the lamp 3 of the headlight.

At the rear of the hood are provided upper and lower circular flanges 7 conforming to the outline of the front plate of the headlight, and the hood or mask is attached to the front plate preferably by means of screws 8 passed through these flanges and threaded into the plate in usual manner. As before stated the device of the invention may be utilized as an attachment in this manner for existing lamps or headlights, by first tapping the plate for the screws 8, and then adapting the hood to the plate, or provision for the incorporation of the device may be made during the course of manufacture of the headlight or lamp, and the device embodied therein as an essential feature.

To provide for illumination of the roadway in the immediate vicinity and at the front of the automobile, an opening 9 is fashioned in suitable manner, in the lower wall of the mask or hood 6, through which rays of light may pass directly from the lamp for this purpose, as indicated by dotted lines in Figure 1, and in this manner adequate provision is made for direct lighting of the roadway for convenience of the driver of the car or automobile.

The forward projection of the light rays or beam of light from the lamp and distant illumination of the roadway, at the sides of the road as well as directly in front of the automobile, I employ a series of horizontally disposed, flat plates or blades 10, 11, composed of this material, as metal, and preferably highly polished on both their upper and under surfaces, and these planes or blades are spaced at regular intervals from the top to the bottom of the hood.

Because of the laterally diverging walls of the hood, due to its elliptical formation as described, the forward ends of the blades or plates are wider than the rear ends, and due to the presence of the opening 9 in the lower rear end of the hood or mask, the rear edges or ends of the plates are caused to terminate on a line disposed at an angle to the vertical front plate of the lamp. This arrangement of plates locates the longer plates near the top of the hood and shorter ones near the bottom of the hood, but to compensate for the decreased length of the plates, the lower plates are projected, as shown in Figure 1, somewhat beyond the front terminals of the upper plates. By the utilization of these plates thus disposed, the light rays emanating from the lamp are directed and projected forward from the lamp on a line parallel with the longitudinal axis of the lamp and hood, and as before stated, the lamp is obscured from the eye except when the line of vision comes in direct alinement with the longitudinal axis of the hood and lamp.

A convenient manner or method of utilizing and attaching the plates is to fashion them in pairs, each pair from a single sheet or blank of metal of proper and required shape, and the pairs form tubular members, rectangular in cross section, with their vertically disposed end walls 12 and 13, brazed, welded or soldered, or otherwise attached to the walls of the hood or mask.

To brace and strengthen the mask or hood, I may utilize a front bead 14 and a rear bead 15, stamped in the metal and projecting from the periphery of the hood, the former encircling the hood at the front, and the latter passing around the hood, diagonally from the rear top edge of the hood.

From the above description taken in connection with my drawings it is obvious that I have provided a device which fulfills the conditions set forth as the purpose and object of my invention, and while the drawings show one complete example of the physical embodiment of my invention, it will be understood that colorable changes and alterations may be made within the scope of the following claims without departing from the spirit of the invention.

What I claim and desire to secure by Letters Patent is—

1. The combination with a headlight and its lamp, of a hood attached to the lamp, a series of fixed, horizontally arranged tubular members forming flat plates, spaced at regular intervals within the hood for forward and distant distribution of light rays, and said hood provided with a lower rear opening at the rear of said plates for passage of light rays.

2. An attachment for a headlight comprising a hood having forwardly diverging lateral walls and a lower rear opening, and a series of fixed, horizontally disposed flat plates spaced at regular intervals and extending from side to side of the hood throughout its length, the rear ends of said plates terminating on a line at an angle to the rear edge of the hood.

In testimony whereof I affix my signature.

GUSTAVE A. WENDT.